W. T. SMITH.
WHEEL FOR MOTOR CARS AND OTHER VEHICLES.
APPLICATION FILED JULY 11, 1908.
1,079,995.
Patented Dec. 2, 1913.
2 SHEETS—SHEET 1.
Fig. 1.
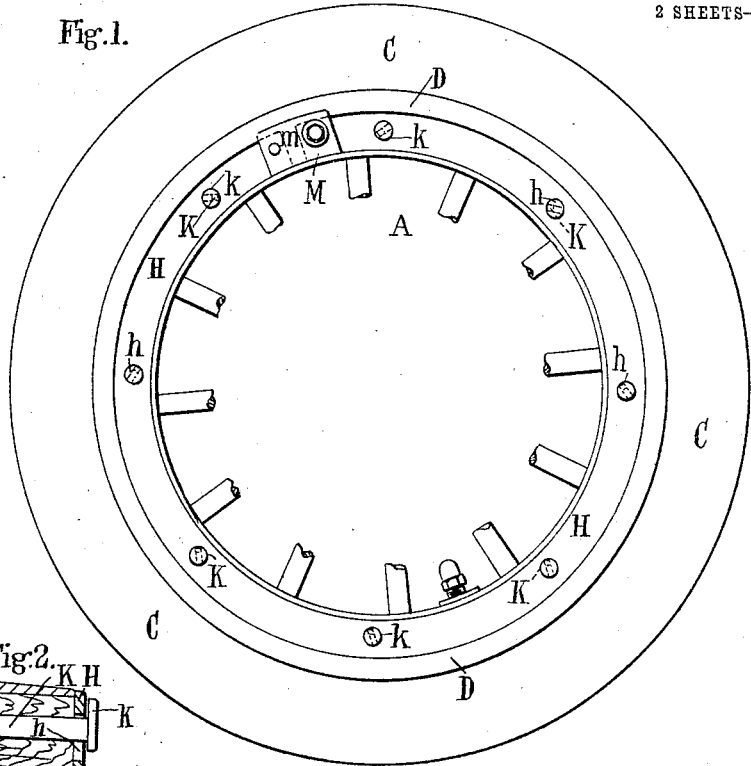
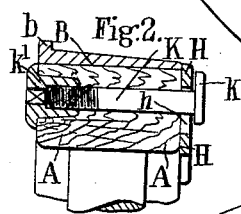
Fig. 2.
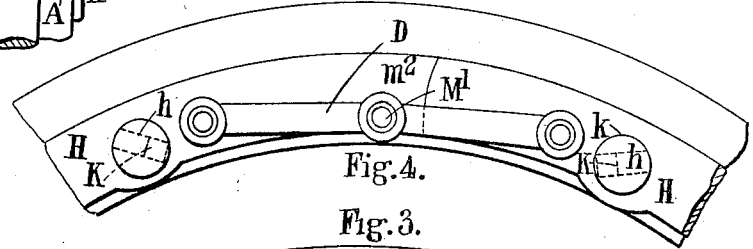
Fig. 4.
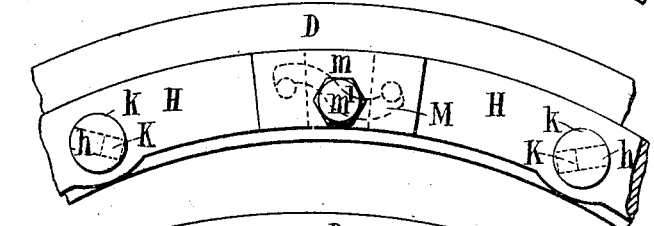
Fig. 3.
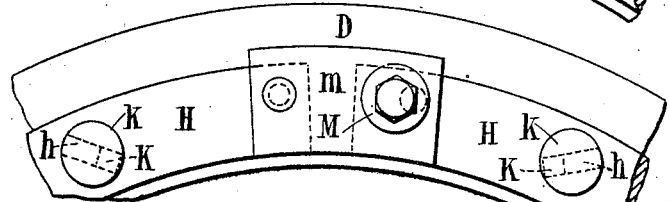
Fig. 5.
Witnesses:
Inventor:
William T. Smith

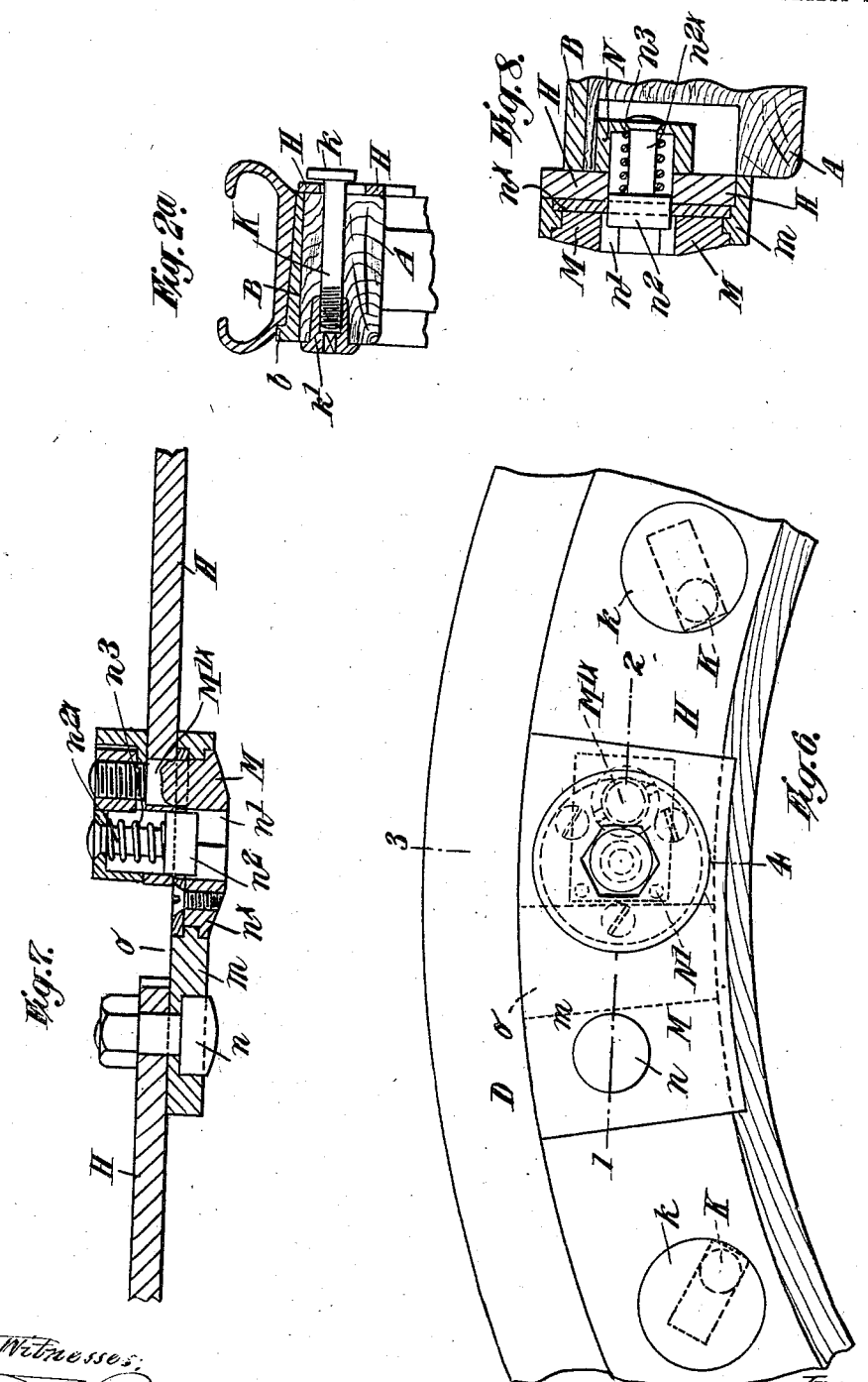

UNITED STATES PATENT OFFICE.

WILLIAM THOMAS SMITH, OF BOLTON, ENGLAND.

WHEEL FOR MOTOR-CARS AND OTHER VEHICLES.

1,079,995.  Specification of Letters Patent.  Patented Dec. 2, 1913.

Application filed July 11, 1908. Serial No. 443,047.

*To all whom it may concern:*

Be it known that I, WILLIAM THOMAS SMITH, a subject of the King of Great Britain, residing at Victoria Street Works, Bolton, in the county of Lancaster, England, have invented certain new and useful Improvements in Wheels for Motor-Cars and other Vehicles, of which the following is a specification.

This invention relates to detachable rims for motor car tires of the kind in which the rim is detachable with the tire from the wheel and is held in position by a discontinuous expansible ring.

According to the present invention I provide improved means for securing the rim to the wheel consisting essentially in an expanding side ring secured to one side of the wheel by devices which are of such a character that while they permit of the complete removal of the said ring from the felly when required they also serve to permit the ring to be expanded or contracted without becoming detached during such operation.

In order that my invention may be clearly understood and readily carried into effect, the same will now be described more fully with reference to the accompanying drawings, in which:—

Figure 1 is a side elevation of wheel with the expanding side ring and tire of wheel in position thereon. Fig. 2 is a transverse section of wheel with the rim and tire removed, showing the expanding side ring contracted. Fig. 2ª is a transverse section showing the removable rim in position. Fig. 3 is an elevation of another form of cam for expanding and contracting the side ring. Figs. 4 and 5 are elevations of still other forms of device for the same purpose. Fig. 6 is an enlarged view showing the device shown in Fig. 5, in detail, the parts being in the expanded position. Fig. 7 is a sectional view on the line 1, 2, of Fig. 6, and Fig. 8 is a cross section on the line 3, 4, of Fig. 6.

The wheel A is of ordinary construction with a hoop B preferably inclined or tapering and having a narrow flange $b$ running around one edge. The detachable rim D is of ordinary or standard construction. The detachable rim D is secured or held in position on the hoop B of the wheel by an expanding side ring H which is secured to the side of the wheel by bolts K passing through the fellies the said ring being expanded and contracted by a cam or cam plate M.

The expanding side ring H is constructed with a number of slots $h$ for the bolts K and suitably inclined and arranged to allow for the expansion and contraction of the side ring without removing the bolts from the wheel. The two holes $h$ opposite the cam M may be made of a size to fit the bolts to secure or anchor the expanding rim at that point allowing it to expand and contract equally at either side thereof.

The bolts K are preferably made with eccentric or T heads $k$ to cover the slots $h$ in the expanding side ring H. The bolts K are secured by nuts $k'$ let into the felly of the wheel at the opposite side to the expanding side ring H. These are preferably made with a square hole to receive a key for tightening them to take up any slackness in the ring H or to otherwise adjust the said bolts.

The open ends of the expanding side ring are secured by a cam or cam plate M by which the ends can be drawn together or forced apart as required. A plate $m$ is riveted to one end of the side ring H and overlaps the other end while an eccentric or cam M is inserted in a hole in the said plate. By rotating the said eccentric cam the ends are drawn together or thrust apart to contract the expanding side ring H or to expand it as the case may be.

Referring more particularly to Figs. 6, 7 and 8, the cam M is pivoted by means of the stud $M^{1x}$ about which it rotates when actuated; the cam plate $m$ in which the said cam is mounted is adapted to oscillate about the pivot $n$ which consists of a stud, fixed in the ring H. The cam is formed with a hexagonal hole $n'$ in which a circular plunger $n^2$ is disposed, the said plunger having a stem $n^{2x}$ which is longitudinally displaceable in the casing M. A spring $n^3$ is disposed around the said stem, which spring tends to keep the said plunger in the position shown in Fig. 7 where the cam is prevented from rotating by the engagement of the plunger $n^2$ with the back plate $n^x$ secured to the cam M, and with the side ring H as shown in Figs. 7 and 8. To contract the ring H the two ends of said ring require to be brought nearer together to fill up the space $o$ and to effect this a hexagonal key having a circular front portion is inserted in the aforesaid hole $n'$. This key depresses the plunger $n^2$ and allows the cam M to be rotated until the two ends of the ring H meet. In another form a plate $m$ is provided with a cam slot $m^2$ engaging with two pins or rivets on the ends of the expanding side plate H. The plate is provided with a nut $m'$ by which to rotate it. By rotating the plate $m$ in one direction the expanding side ring is contracted and by rotating it in the opposite direction, expanded, see Fig. 3. In another form a toggle link M' is pivoted to the ends of the expanding side plate H by which the ends can be drawn together or forced apart to contract or expand it as required. A plate $m^2$ is riveted to the joint of the toggle to fill the gap between the two ends when the expanding side plate is expanded, see Fig. 4. Any other convenient form of device for drawing together and forcing apart the ends of the expanding side ring H to contract and expand it may be employed.

What I claim is:—

1. In a vehicle wheel having a detachable rim, the combination with the felly, of a flat expansible side ring having slots therein suitably inclined and arranged to allow the said ring to expand and come above the side of the rim or contract and come below the side of the rim, and bolts attached to the felly and passing through said slots.

2. In a vehicle wheel having a detachable rim, the combination with the felly, of a flat expansible side ring, there being slots in said ring suitably inclined and arranged to allow the said ring to expand and come above the side of the rim or contract and come below the side of the rim, bolts attached to the felly and passing through said slots, and a cam device for expanding and contracting said ring, substantially as described.

3. In a vehicle wheel having a detachable rim, the combination with the felly, of a plain expansible side ring having slots therein suitably inclined and arranged to allow the said ring to expand and come above the side of the rim or contract and come below the side of the rim, bolts attached to the felly and passing through said slots, and heads on said bolts bearing against the outer side of said ring.

In testimony whereof I affix my signature in presence of two witnesses.

WILLIAM THOMAS SMITH.

Witnesses:
I. OWDEN O'BRIEN,
HARRY BARNFATHER.

---

Copies of this patent may be obtained for five cents each, by addressing the "Commissioner of Patents, Washington, D. C."